Patented June 14, 1938

2,120,393

UNITED STATES PATENT OFFICE 2,120,393

PRINTING INK

Richard A. Crawford, Akron, Ohio, assignor to The B. F. Goodrich Company, New York, N. Y., a corporation of New York No Drawing. Application December 12, 1935, Serial No. 54,087

1 Claim. (Cl. 134—17)

This invention relates to the art of printing ink manufacture, and more particularly to an improved printing ink composition of the drying oil type.

An object of this invention is to provide an ink which does not swell rubber, suitable for printing from rubber plates. Another object is to provide an ink which has superior adhesion to rubber articles and which can be applied either by direct printing using any standard printing press, by stencilling, by stamping, by transfer labels, or by any other ordinary methods of printing with drying oil inks. A further object of this invention is to provide an ink for general use which can be applied by any standard printing equipment and which possesses improved covering power, better spreading properties, superior resistance to smearing and offsetting of freshly printed surfaces, and which does not skin in the can, thus reducing or eliminating losses due to this cause. Still another object is to provide an ink which transfers designs in finer and sharper detail than do present commercial inks.

Heretofore linseed and other vegetable drying oil inks have been used with rubber printing plates and for printing designs or labels on rubber articles by either direct printing, transfer labels, or stamping. When used with rubber printing plates such inks cause the rubber of the plates to swell and are likely to destroy the usefulness of the plates. When used to print designs on rubber articles, such inks do not have good adhesion to the rubber and can be smeared or rubbed off so that the labels are either not permanent or do not remain clear and distinct during the service life of the article.

Water color inks have also been used with rubber printing plates, but such inks are not water fast and require special presses, since they dry by evaporation.

Colored rubber cements made from softened rubber dissolved in organic solvents have been used for marking rubber articles, but such cements cannot be used with standard printing equipment, since they dry by evaporation of the solvent. Designs and labels on rubber articles have been produced by depositing thereon films from colored aqueous dispersions of rubber, such as rubber latex compositions, either directly or by transfer, but these latex compositions are not suitable for use with standard printing equipment, and require vulcanization or an adhesive to secure good adhesion, and vulcanization to produce satisfactory dryness and resistance to aging.

Solutions of scrap tires in petroleum distillate have been proposed for printing inks. Such inks dry either by evaporation or by absorption of the oil into the article. They are not suitable for use with rubber printing plates because mineral oils produce considerable swelling of the printing plate rubber and ultimately destroy their usefulness.

This invention avoids all the difficulties and disadvantages of the prior practices and proposals. The invention consists broadly in the production of inks having for a vehicle liquefied rubber made by heating rubber, in any of its various forms, such as caoutchouc, or crude rubber, latex, balata, gutta percha, scrap vulcanized rubber, or reclaimed rubber, at atmospheric pressure or under a higher pressure, in air, inert gas, or a reducing atmosphere with or without the presence of a reducing catalyst, until the residue remains liquid after cooling to room temperature. The fluidity of the liquefied rubber can be varied at will by the time and temperature of heating. For quick production the temperature must be 250° C. or higher. When a reducing atmosphere and a catalyst are used, the degree of reduction may be controlled by selection of the catalyst and the conditions of heating to produce any desirable degree of unsaturation. To this vehicle are added any desired ink pigments; and waxes, oils, and/or commercial ink reducers may be added to produce any desired consistency and tooth. The inks so produced are stable, work extraordinarily well in the printing press, and have no bad effect even on rubber rolls and plates, nor do they skin over appreciably in the can, in spite of the fact that their chemical unsaturation is generally greater than that of linseed oil.

Having now described broadly the nature and advantages of my invention, the following specific examples will serve as illustrations of certain preferred embodiments thereof:

Example 1

Crude plantation crepe rubber is heated at atmospheric pressures in a kettle provided with an air cooled reflux condenser. At a temperature of about 250–260° C. the rubber is converted to a liquid which is withdrawn as fast as it forms. After cooling the liquid has about the consistency of molasses. It may be made up into an ink of the following composition:

| | Parts by weight |
|---|---|
| Liquefied rubber | 100 |
| Ink black | 50 |
| Petrolatum | 10 |
| Montan wax | 4 |
| Castor oil | 15 |

Example 2

Crude plantation crepe rubber is heated in an autoclave in an atmosphere of nitrogen or carbon dioxide at 250–260° C. until a uniform liquid of the desired viscosity is obtained, which may require about four hours in an autoclave of three inches diameter. A similar product may be obtained from vulcanized rubber. After cooling it is compounded into a red ink as follows:

| | Parts by weight |
|---|---|
| Liquefied rubber | 100 |
| Titanium dioxide | 120 |
| Cadmium lithopone | 120 |
| Red toner | 44 |
| Petrolatum | 6 |
| Montan wax | 6 |
| Castor oil | 60 |

Example 3

100 parts by weight of crude plantation crepe rubber is placed in an autoclave with 264 parts of normal hexane and 10 to 50 parts of an active nickel catalyst. The autoclave is swept out with hydrogen and hydrogen is then admitted until the pressure is 1000# per sq. in., and the temperature is raised to 300° C. The hydrogenation is allowed to take place at this temperature with suitable agitation for two hours, after which time the unsaturation of the rubber is reduced about one half. Viscosity and unsaturation may be varied over wide limits by hydrogenating a longer or shorter time. The hexane is evaporated off and the liquefied rubber remaining is compounded as follows:

| | Parts by weight |
|---|---|
| Liquefied rubber | 100 |
| Aluminum powder | 50 |
| Wool grease | 7 |

Example 4

Gray tube reclaim is treated as described in Example #3 and compounded as follows:

| | Parts by weight |
|---|---|
| Liquefied rubber | 100 |
| Chrome orange | 100 |
| Carnauba wax | 6 |
| Cumarone resin | 6 |

Example 5

Scrap gray inner tubes are treated as described in Example #3 and compounded as follows:

| | Parts by weight |
|---|---|
| Liquefied rubber | 100 |
| Titanium dioxide | 100 |
| Castor oil | 15 |

Example 6

Liquefied rubber obtained as in Example #3 may also be compounded as follows:

| | Parts by weight |
|---|---|
| Liquefied rubber | 100 |
| Ink black | 30 |
| Montan wax | 6 |
| Cobalt oleate | 6 |
| Manganese oleate | 1 |

Example 7

Balata or gutta percha is heated in an autoclave in an atmosphere of nitrogen or carbon dioxide at 250–260° C. as in Example 2 until the liquid residue has the desired consistency after cooling to room temperature. The liquefied rubber thus obtained is compounded as follows:

| | Parts by weight |
|---|---|
| Liquefied rubber | 100 |
| Cadmium lithopone | 50 |
| Ultramarine blue | 38 |
| Degras | 4 |
| Mineral oil | 7 |
| Cobalt oleate | 6 |

The invention is not limited to the specific examples given above which are merely for the purpose of illustration. It will be understood that any of the liquefied rubbers may be employed in any of the ink compositions recited above or in other ink compositions by substituting the liquefied rubber for the drying oils ordinarily employed. One of the usual oil dryers should ordinarily be incorporated in those inks which are to dry by oxidation at room temperatures. Inks which are to be heated, such as those used for printing either directly or by transfer on rubber which is subsequently to be vulcanized, will ordinarily not require the addition of dryers. The liquefied rubber prepared in an inert atmosphere is particularly valuable as a vehicle for inks which are to be used with rubber printing plates, as its swelling effect on the rubber of the plates is negligible.

I claim:

A printing ink containing as a vehicle heat-liquefied rubber.

RICHARD A. CRAWFORD.